Nov. 30, 1965 P. DE WAARD 3,221,271
CIRCUIT FOR KEEPING CONSTANT THE CENTRAL FREQUENCY OF A FREQUENCY-MODULATED OSCILLATOR
Filed June 15, 1962 2 Sheets-Sheet 1

INVENTOR.
Pieter De Waard
BY
Watson Cole Grindle & Watson
Attys.

Nov. 30, 1965 P. DE WAARD 3,221,271

CIRCUIT FOR KEEPING CONSTANT THE CENTRAL FREQUENCY OF A FREQUENCY-MODULATED OSCILLATOR

Filed June 15, 1962 2 Sheets-Sheet 2

INVENTOR.
Pieter De Waard
BY
Watson, Cole, Grindle & Watson
Attys.

United States Patent Office 3,221,271

Patented Nov. 30, 1965

3,221,271

CIRCUIT FOR KEEPING CONSTANT THE CENTRAL FREQUENCY OF A FREQUENCY-MODULATED OSCILLATOR

Pieter de Waard, Monster, Netherlands, assignor to Nederlandse Organisatie Voor Toegepast-Natuurwetenschappelijk Onderzoek ten Behoeve van Nijverheid, Handel en Verkeer, The Hague, Netherlands, a corporation of The Netherlands Filed June 15, 1962, Ser. No. 202,810
Claims priority, application Netherlands, June 26, 1961, 266,360
3 Claims. (Cl. 332—19)

The present invention relates to a circuit for keeping constant the central frequency of an oscillator which is to be frequency-modulated, whereby a control voltage is derived from the oscillator signal with the aid of a frequency detector, which control voltage is activated in a modulator which is connected before the oscillator and to which the modulating oscillation can at the same time be fed.

Such circuits are known in the art.

These known circuits comprise a frequency-modulated main oscillator, the central frequency of which is to be kept constant, a stable reference oscillator which is tuned to the central frequency, a mixer which is connected to the main oscillator and to the reference oscillator, and a frequency detector which is connected to the mixer and from which the control voltage for the adjustment of the frequency of the main oscillator is derived.

Such a circuit is expensive and intricate as a result of the large number of elements incorporated in it, such as for instance the reference oscillator which determines the stability of the circuit.

An object of the invention is to construct a simple and cheap circuit.

For this purpose the invention is characterized in that a stable frequency detector is applied which is provided with an electromechanical element, the frequency detection curve of said stable frequency detector being mainly determined by the properties of the element, and the input of the said stable frequency detector being directly connected to the oscillator output, and in that the modulating oscillation is fed to the modulator via a filter influences the modulation index, in such a way that the slope of this detection curve does not change its sign more than twice.

This invention is based on the insight that the occurrence in a stabilization circuit of more than one stable control range of the frequency detection curve of a frequency detector is the result of an interference of the proper oscillation of the electromechanical element with the signal supplied to the detector and that the number of these sable ranges can be reduced to one if care is taken that the modulation index does not exceed a certain limiting value, and that such a frequency detector owing to its great stability, its high sensitivity and its narrow band-width is able directly to determine the stability of the circuit, so that the sable reference oscillator the use of which in the known circuits is required for this purpose can be done away with.

Consequentially, in the circuit according to the invention the reference oscillator as well as the mixer are saved, so that the circuit is extremely simple and unexpensive.

In one embodiment of the invention the frequency detector is a crystal detector. Such crystal detectors are generally known. In the periodical, "The General Radio Experimenter," for instance, in volume 34, November–December 1960, page 11, there is a description of a crystal detector eminently suitable for use in hte present circuit. To obtain a good stabilization it is necessary for the band width of the detector to be larger than the drift of the oscillator.

It has been found that a crystal detector having a crystal excited in its third harmonic of for instance 66 $MH_z$ has a linear region of about $500H_z$ and a band width of $2KH_z$ between its tops with the abreviations expressed as follows.

$H_z$=cycle per second
$MH_z$=1,000,000 cycles per second
=1 million cycles per second
=1 megacycle per second
$KH_z$=1000 cycles per second
=1 thousand cycles per second
=1 kilocycle per second The momentary frequency of the modulated signal periodically passes the natural frequency of the crystal. Hereby the crystal is periodically excited in its natural frequency. This natural frequency interferes with the momentary frequency of the modulated signal, which causes an extra amplitude modulation, and if the amplitude of the natural oscillation of the crystal is too large, undesired extra maxima and minima occur in the frequency detector curve. In order to limit the amplitude of the natural oscillation, the momentary frequency of the modulated signal must pass the natural frequency of the crystal with a determined minimum velocity. In that case no additional maxima and minima occur.

This can be achieved by influencing the modulation index. By the modulation index is to be understood the proportion between the frequency deviation of the modulated signal and the frequency of the modulating oscillation.

For low values of the modulating frequency the crystal can completely finish oscillating before the frequency of the modulated signal has passed the crystal frequency, and there is no danger of additional maxima and minima in the frequency detection characteristic.

Herefrom it is apparent that, for instance in a modulating oscillation having a frequency of 1 c./s. and a frequency deviation of 1000 c./s. ($m=1000$) no disturbing interference phenomena occur. In a modulating oscillation having a frequency of 1500 c./s. a frequency deviation of at most 750 can be applied ($m=0.5$). The character "$m$" means the modulation-index.

If a modulation of extremely low frequencies is not required a high pass filter can according to this invention be applied as the filter which influences the modulation index.

In the drawings.

In these figures like reference numerals ferer to like elements.

Figure 1:
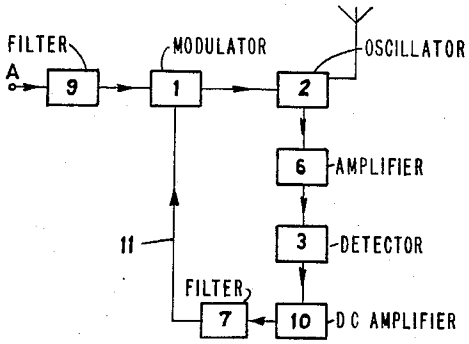
FIG. 1 is a block diagram of the circuit according to the invention.

In FIG. 1 the oscillator 2 is connected via the high frequency amplifier 6 to the stable frequency detector 3 from which the control voltage is derived and which is connected via an amplifier 10 and a low pass filter 7 to the modulator 1 by a conductor 11.

Before the modulator 1 is connected a filter 9 which influences the modulation index.

Figure 2:
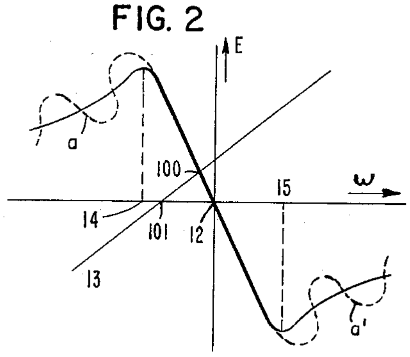
FIG. 2 is a frequency detection curve of a crystal detector, as it presents itself for low values of the modulation index according to the invention.

If the filter is chosen in such a way that the momentary frequency of the modulated signal passes the natural frequency of the crystal with a determined minimum velocity, which is to say that the modulation index of the signal at the output of the filter is small enough for all frequencies, then a frequency detection curve as drawn in FIG. 2 is obtained.

Figure 4:
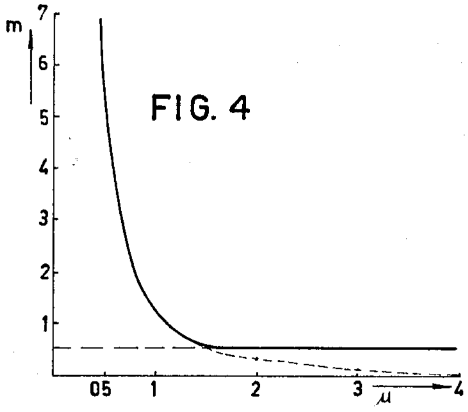
FIG. 4 is a graph representing the maximum allowable modulation index as a function of the modulating frequency for the crystal used.

FIG. 4 shows the maximum allowable as a function of the modulating frequency for the crystal used. Crystals having a different band width may show a different graph.

In FIG. 2 the output voltage E of the detector is set out on the vertical axis and the frequency W is set out on the horizontal axis (fully drawn line).

The central frequency coincides with the frequency in the point 12.

The band width of the detector is found between the points 14 and 15 and in the embodiment shown as example it amounts to 2kc./s.

The curve shows only one range for which the control is stable, to wit the part between the points with the abscissas 14 and 15; the intersection point 100 with the control line 13 determining the frequency at which the circuit stabilizes itself.

Figure 3:
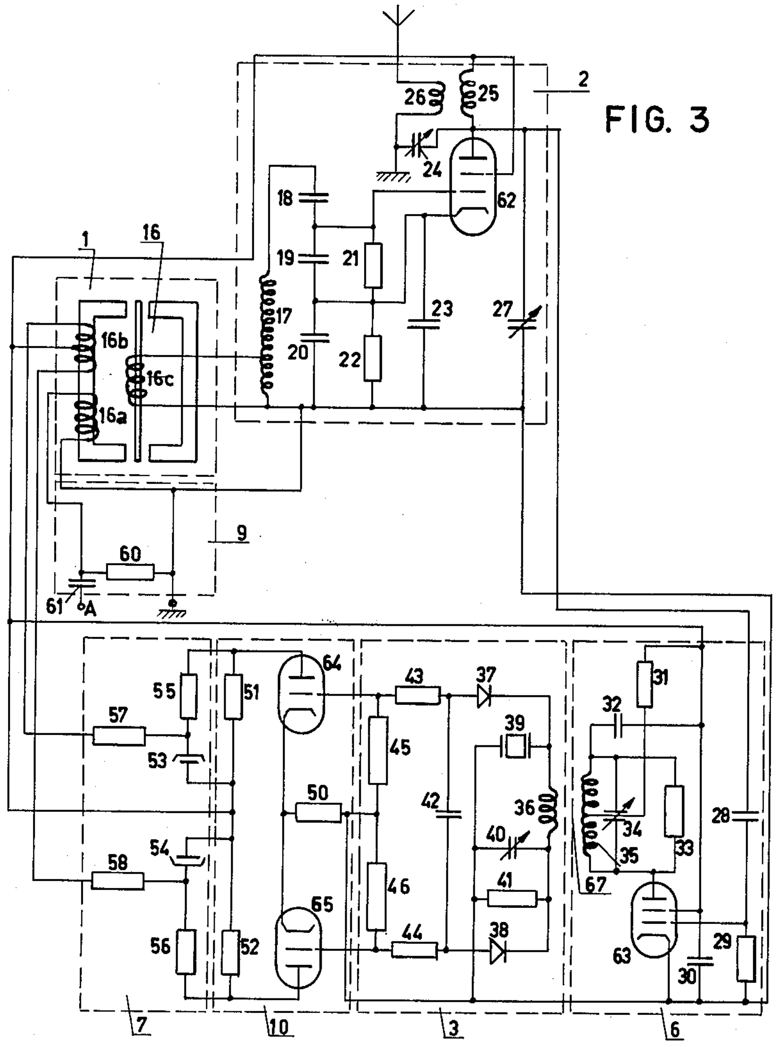
FIG. 3 is a more elaborated embodiment of the invention.

However, according to the invention a frequency deviation is selected which is considerably larger than the bandwidth of the crystal and in the embodiment according to FIG. 3 it amounts to 5 kc./s.

These circumstances may give rise to a discrimination curve according to the dotted line of FIG. 2 the parts *a* and *a'* forming new stable control reaches.

This is impermissible because a detection curve having a plurality of stable points of intersection with the control line is not unambiguous and, therefore, unsuitable for the precise adjustment of the oscillator, and in order to avoid this the modulation index should be restricted as indicated in FIG. 4.

The control line 13 indicates the value of the control voltage to be supplied to the modulator 1 which is necessary for the change of the central frequency of the signal of the oscillator 2. The control line 13 belongs to a determined frequency deviation of the central frequency of the oscillator. Said frequency deviation is indicated by the distance between the points 12 and 101 which represents the difference in frequency.

When the point 101 is shifted, the control line 13 is shifted with it parallel to itself.

The slope of the control line is inversely proportional to the sensitivity of the modulator circuit.

A detection curve having a plurality of stable points of intersection with the control line is not unambiguous and, therefor, unsuitable for the precise adjustment of the oscillator.

In FIG. 1 a high-frequency amplifier 6 is connected between the oscillator 2 and the detector 3.

The amplifier 6 is mainly used for adapting the detector 3 to the oscillator 2. A direct current amplifier 10 is used for adapting the detector 3 to the modulator 1.

In FIG. 3 the filter 9 which influences the modulation index and which limits the modulation index to the value corresponding to FIG. 4, comprises the resistance 60 and the condenser 61.

The ferrite modulator 16 is provided with a modulation winding **16*a*, a control winding for the control voltage 16*b* and a control coil 16*c*. The control coil 16*c* is connected to the coil 17 of the oscillator tube 62**, which tube is further provided with the requisite adjusting capacitances and resistances in a conventional way.

The coil 26 which is used for drawing the high frequency energy is inductively coupled to the coil 25 in the tuned anode circuit of the tube 62. The tube 62 is further connected to the high frequency amplifier tube 63 which is provided in the anode circuit of an air transformer 67 having a tuned primary winding 35 and a secondary winding 36 with a smaller number of turns.

The winding 36 forms part of the detector circuit 3, in which a crystal 39 is employed as the electromechanical element.

The detector circuit comprises the diodes 37, 38, the crystal 39 already mentioned, the condensers 40, 42 and the resistances 41, 43, 44, 45, 46.

The control voltage is guided back to the control winding **16*b* of the modulator 1 via a direct current amplifier 10 comprising the tubes 64 and 65 and the resistances 50, 51, 52 and a low pass filter 7 comprising the resistances 55, 56, 57 and 58 and the condensers 53 and 54**. Catalogue and data of the elements employed in the embodiment of the invention:

Central frequency: 66 $MH_z$; Modulation 150–2500 $H_z$; Deviation 5 $KH_z$.

Ferrite modulator:

- Coil **16*c*** 10 turns; 0.45 copper enamel/silk; core material ferroxcube
- Coil **16*a*** 400 turns; 0.08 copper enamel
- Coil **16*b*** 400 turns; 0.08 copper enamel; core material ferroxcube
- Coil 17 11 turns; 1 tap on 4 turns; 0.8 copper enamel/silk
- Former of coil 8 mm. diameter
- Coil 26 1 turn and Coil 25 7 turns—0.5 mm. copper enamel/silk
- Former of coil 6 mm. diameter.
- Coil 35 8 turns and Coil 36 2 turns—0.45 mm. copper enamel/silk
- Former of coil 6 mm. diameter

| Resistances | Ohms |
|---|---|
| **21** | 47000 |
| **22** | 820 |
| **29** | 27000 |
| **31** | 100 |
| **33** | 5600 |
| **41** | 220.000 |
| **43** | 1000.000 |
| **44** | 1000.000 |
| **45** | 1000.000 |
| **46** | 1000.000 |
| **50** | 100 |
| **51** | 6800 |
| **52** | 6800 |
| **55** | 22000 |
| **56** | 22000 |
| **57** | 12000 |
| **58** | 12000 |
| **60** | 47000 |

| Condensers | | |
|---|---|---|
| **18** | $\mu\mu$farads | 12 |
| **19** | do | 68 |
| **20** | do | 68 |
| **23** | do | 33 |
| **24** | do | [1]5 |
| **27** | do | [1]10 |
| **28** | do | 3,9 |
| **30** | do | 3300 |
| **32** | do | 4.7 |
| **34** | do | [1]2×10 |
| **40** | do | 10 |
| **42** | do | 150 |
| **61** | do | 1800 |
| **53** | $\mu$farads | 25 |
| **54** | do | 25 |

| Tubes: | |
|---|---|
| **62** | E 180 F |
| **63** | EF 80 |
| **64** | E88CC |
| **65** | E88CC |
| Crystal base frequency | 22 $MH_z$ |
| Diodes | |
| **37** | OA85 |
| **38** | OA85 |

[1]Variable.

I claim:

1. A device comprising an oscillator, a modulator, means connecting the output of the modulator to the input of said oscillator, a frequency detector with an electro-mechanical element, which detector is coupled between the output of said oscillator and the input of said modulator, the frequency detection curve of said detector being mainly determined by the properties of the element, and the modulating wave being fed to said modulator by means of a filter which influences the modulation-index, so that the slope of this detection curve does not change its sign more than twice.

2. A device according to claim 1, wherein the frequency detector is a single crystal detector.

3. A device according to claim 1, wherein a high pass filter is connected to the input of said modulator which influences the modulation-index so that the ratio of the frequency deviation to the frequency of the modulating wave above 1500 cycles is less than 0.5.

References Cited by the Examiner

UNITED STATES PATENTS 2,501,368 3/1950 White -------------- 325—148

OTHER REFERENCES

Ostlund et al., Proc. of the I.R.E., October 1947, "Center - Frequency - Stabilized Frequency - Modulation System," pages 1144–1148.

Ruston, Proceedings of the I.R.E., "A Simple Crystal Discriminator for FM Oscillator Stabilization," pages 783–788, July 1951.

ROY LAKE, *Primary Examiner.*

ALFRED L. BRODY, *Examiner.*